Patented June 24, 1930

1,767,536

UNITED STATES PATENT OFFICE

CHARLES JOSEPH MICHEL MARIE LE PETIT, OF PARIS, FRANCE, ASSIGNOR, BY DIRECT AND MESNE ASSIGNMENTS, TO RÖHM AND HAAS COMPANY, OF PHILADELPHIA, PENNSYLVANIA, A CORPORATION OF DELAWARE

PROCESS FOR DEHAIRING HIDES AND SKINS AND PREPARING THEM FOR TANNING

No Drawing. Application filed May 21, 1926, Serial No. 110,816, and in France April 18, 1925.

This invention relates to a process for dehairing hides and skins and preparing them for tanning. It relates especially to the preparation of hides to be tanned by using certain varieties of *mucedinaceæ* which have not been used before my invention for this purpose. The invention includes special ways of proceeding in the preparation of the cultures and the operating media, and more particularly in connection with the use of seeds or seed worts that are to be used for the culture medium.

I have discovered that *Aspergillus oryzæ* and similar Aspergilli, as well as certain varieties of mucor, are capable of producing proteolytic enzymes which are especially useful in connection with the process of dehairing hides and skins and in the preparation of the same for tanning. The species *Aspergillus oryzæ* is particularly applicable for this use.

I have also discovered that it is not necessary to sterilize bran or other medium for the culture of *mucedinaceæ* by heat before it is sown with the spores of the selected *mucedinaceæ*. I have found instead that the culture medium may be impregnated with various substances in solution, such as salicyllate of soda, formic aldehyde (methyl aldehyde), lactic acid, pure tannic acid, or with tanning extracts, and more particularly quebracho extract. Tanning extracts have been found to be especially useful in this connection.

The culture medium, such as bran, or grain, or grain wort impregnated with one or more of the substances above mentioned that effect a kind of sterilization has proven to cause a selective and rapid growth of varieties of *mucedinaceæ* that is particularly adapted for use in dehairing hides. The use of these materials in practice has indicated that the culture medium appears to undergo a relative sterilization, and is so conditioned that the varieties of *mucedinaceæ* that are suitable for dehairing purposes are selectively grown, and the desirable species are propagated more rapidly, and the less desirable species are, in large measure, prevented from developing.

The following is given by way of example as a particular illustration of the invention. About 100 parts by weight of bran may have added thereto about an equal weight of an aqueous solution containing 15 per cent quebracho extract. This culture medium will cause almost exclusive propagation of *Aspergillus oryzæ*, after fertilization with the spores of this species.

As another example, it may be mentioned that seeds or wort of fermented grain, such as castor beans, corn, wheat, cotton, etc., may be mixed with a suitable amount of lactic acid, either before or after saccharification or fermentation, and then seeded with *Aspergillus oryzæ* by means of the culture on bran and quebracho. For this purpose, about 50 per cent of a 5 per cent aqueous solution of lactic acid may be used to saturate or impregnate 100 parts by weight of the grain. On such a culture medium the species develops quickly and almost exclusively, and the secretion of the proteolytic enzymes is very abundant and very active.

The medium containing the enzymes is diluted by adding a sufficient amount of water and the product is used for dehairing hides, skins, etc., by immersing the hides, etc., and permitting the same to remain therein for the required length of time. The reaction for producing the proteolytic enzymes or the hydrolysis of the protein substances contained in the roots of the hair and in the skin is very noticeable because of the ammonia that is evolved during the reaction.

Instead of dehairing the hides as mentioned above, the process may be carried out by using the cultures of *mucedinaceæ* on bran alone, especially cultures of *Aspergillus oryzæ*, for dehairing the hides and the skins. The process may be carried out by adding 100 parts of an acqueous solution containing about 5 per cent of lactic acid to about 100 parts of bran, and this medium may be seeded with the spores of *Aspergillus oryzæ*. When the culture has been in progress for a suitable length of time, varying from 36 to 48 hours, giving time for myceliums to grow in the mass, but before an objectionable amount of spores have been formed, the mass is trituated in a suitable quantity of water. Sodium fluoride or other preservative may be added to the acqueous dilution in amounts ranging between 0.1 per cent and 5 per cent, and the dilution may be used directly for dehairing hides and skins, the dehairing taking place in a few hours.

I claim:

1. In the process of unhairing and bating hides and skins the step which comprises subjecting them to the action of a solution containing the culture of mucedinaceous fungi.

2. In the process of unhairing and bating hides and skins the step which comprises subjecting them to the action of a solution containing the culture of *Aspergillus oryzæ*.

CHARLES JOSEPH MICHEL MARIE LE PETIT.